(12) United States Patent
Amano et al.

(10) Patent No.: US 7,701,648 B2
(45) Date of Patent: Apr. 20, 2010

(54) FRESNEL LENS

(75) Inventors: Takashi Amano, Kanagawa (JP); Tsunehisa Nakamura, Tokyo (JP)

(73) Assignee: 3M Innovative Properties Company, St. Paul, MN (US)

( * ) Notice: Subject to any disclaimer, the term of this patent is extended or adjusted under 35 U.S.C. 154(b) by 91 days.

(21) Appl. No.: 12/063,042

(22) PCT Filed: Sep. 11, 2006

(86) PCT No.: PCT/US2006/035335

§ 371 (c)(1),
(2), (4) Date: Feb. 6, 2008

(87) PCT Pub. No.: WO2007/033089

PCT Pub. Date: Mar. 22, 2007

(65) Prior Publication Data

US 2008/0204901 A1    Aug. 28, 2008

(30) Foreign Application Priority Data

Sep. 14, 2005    (JP)    ............................. 2005-266321

(51) Int. Cl.
G02B 3/08    (2006.01)
(52) U.S. Cl. ..................................... 359/742; 359/743
(58) Field of Classification Search .................. 359/742, 359/743, 457, 460
See application file for complete search history.

(56) References Cited

U.S. PATENT DOCUMENTS

| | | | |
|---|---|---|---|
| 2,117,252 A | 5/1938 | Lee | |
| 4,337,759 A | 7/1982 | Popovich et al. | |
| 4,755,921 A | 7/1988 | Nelson et al. | |
| 4,904,069 A | 2/1990 | Nakata | |
| 4,930,867 A * | 6/1990 | Negishi | ..................... 359/834 |
| 5,803,568 A | 9/1998 | Eckhardt | |
| 5,871,653 A | 2/1999 | Ling | |
| 6,046,859 A | 4/2000 | Raj | |
| 6,717,747 B2 | 4/2004 | Kaneko | |
| 6,821,810 B1 | 11/2004 | Hsiao et al. | |
| 2004/0112424 A1 | 6/2004 | Araki et al. | |

FOREIGN PATENT DOCUMENTS

| | | |
|---|---|---|
| JP | 11344605 A | 12/1999 |
| JP | 2000019309 A | 1/2000 |
| JP | 2002-055273 | 2/2002 |
| JP | 2002221605 A | 8/2002 |
| KR | 2002-0083026 | 11/2002 |
| WO | WO 03/083943 | 10/2003 |

* cited by examiner

*Primary Examiner*—Timothy J Thompson
(74) *Attorney, Agent, or Firm*—Colene H. Blank (57) ABSTRACT

When using an acrylic resin with a refractive index of 1.494, for example, the structure of the Fresnel lens is such that in a segment where a deviation angle of 19.5° or less is required, refraction-only prisms which do not cause any reflections are used, while in a segment where a deviation angle of 31.0° or larger is required, single-step total reflection prisms in which light is totally internally reflected once and then refracted are used and, in a segment where a deviation angle not smaller than 19.5° but not larger than 31.0° is required, two-step total reflection prisms in which light is totally internally reflected twice and then refracted are used.

4 Claims, 8 Drawing Sheets

FRESNEL LENS

CROSS REFERENCE TO RELATED APPLICATIONS

This application is a national stage filing under 35 U.S.C. 371 of PCT/US2006/035335, filed Sep. 11, 2006, which claims priority to Japanese Application No. 2005-266321, filed Sep. 14, 2005, the disclosure of which is incorporated by reference in its/their entirety herein.

TECHNICAL FIELD

The present invention relates to a Fresnel lens.

BACKGROUND ART

A Fresnel lens is a lightweight and compact flat lens constructed by replacing the curved surface of a convex lens or a concave lens with a series of discontinuous curved surfaces formed by a plurality of prisms arranged concentrically or in parallel, thereby reducing the lens thickness to the minimum required to achieve the necessary curved surface.

Fresnel lenses are widely used to convert a light beam from a point light source into a parallel beam of light, such as a lens used with a backlight in a liquid crystal display, or conversely to concentrate a parallel beam of light into a defined beam, such as a condensing lens used in a solar power generating system.

In a Fresnel lens having a small F-number (focal length/lens diameter), the angle of light deflection (known as the angle of deviation) is larger at the lens peripheral regions located farther away from the optical axis. In such regions, since the angle of the slanted face of each prism is large, and the angle of incidence on the refracting interface is therefore large, reflections at the refracting interface increase and the transmittance decreases. To address this, it has been known to improve the transmittance in a segment where a large deviation angle is required by designing the vertex angle of the prism so that the incident light is first totally reflected at the slanted face of the prism and then refracted at the perpendicular face, and such Fresnel lenses are disclosed, for example, in U.S. Pat. No. 4,755,921, Japanese Unexamined Patent Publication No. 2002-221605 and U.S. Pat. No. 4,337,759.

SUMMARY OF THE INVENTION

The present invention provides a Fresnel lens using prisms whose transmittance is improved compared with the prior art.

According to the present invention, there is provided a Fresnel lens constructed from a plurality of prisms, wherein at least some of the plurality of prisms each have a vertex angle that causes incident light from a focal point or incident light entering from an opposite side thereof in parallel to an optical axis to be totally internally reflected at least twice.

The Fresnel lens comprises, for example, a first segment formed from prisms each having a vertex angle that does not cause the incident light to be totally reflected, and a second segment adjacent thereto and formed from prisms each having a vertex angle that causes the incident light to be totally internally reflected twice.

The Fresnel lens may further comprise a third segment adjacent to the second segment and formed from prisms each having a vertex angle that causes the incident light to be totally internally reflected once.

By forming a portion of the Fresnel lens from prisms in which the incident light is totally internally reflected at least twice, reflections at the refracting faces are reduced, which serves to further improve the transmittance.

DETAILED DESCRIPTION OF PREFERRED EMBODIMENTS

The only difference between a light-gathering Fresnel lens used in a solar power generating system or the like and a Fresnel lens used with a backlight in a liquid crystal display or the like to obtain parallel light is the direction of light entering the lens. Accordingly, the following description deals with a light-gathering Fresnel lens, but the description is equally applicable to the case of a Fresnel lens for obtaining parallel light. Further, the description deals with a circular Fresnel lens in which prisms are arranged in concentric circles, but the same description also applies to a linear Fresnel lens in which prisms are arranged side by side in parallel.

Figure 1:
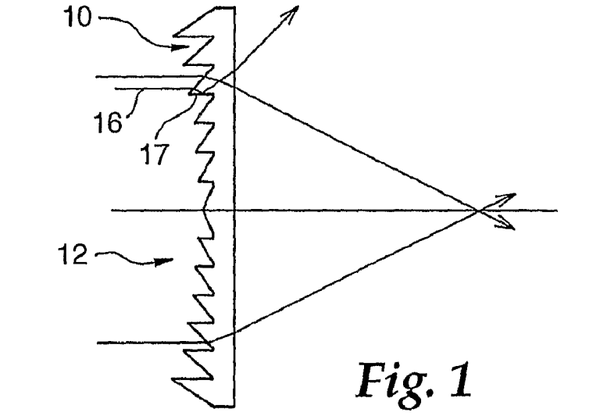
FIG. 1 is a diagram showing a light-gathering Fresnel lens of the type in which incident light enters a grooved side.
Figure 2:
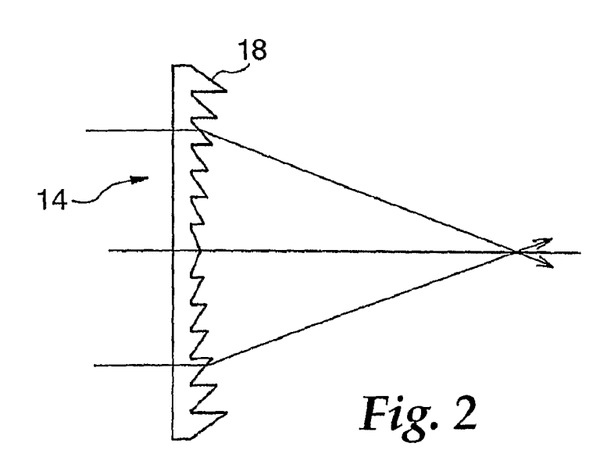
FIG. 2 is a diagram showing a light-gathering Fresnel lens of the type in which incident light enters a flat side.
Figure 3:
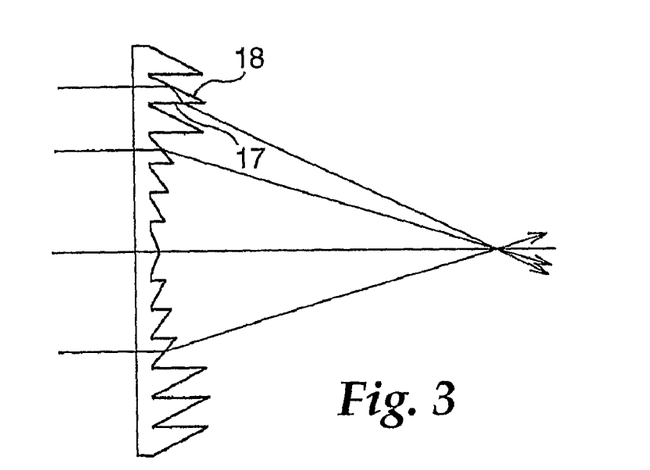
FIG. 3 is a diagram showing a Fresnel lens that uses single-step total reflection prisms in a portion thereof.

There are two types of light-gathering Fresnel lens: the type in which incident light enters a grooved side 12 where many grooves 10 for forming many prisms are formed, as shown in FIG. 1, and the type in which incident light enters a flat side 14, as shown in FIG. 2. In the type in which the incident light enters the grooved side 12, as shown in FIG. 1 the light 16 incident on a portion near a perpendicular face 17 of the prism is totally reflected at the perpendicular face 17 and is not focused at the intended focal point; therefore, such light does not make any contribution to the light gathering power. Accordingly, to gather solar light with high efficiency, the type in which the incident light enters the flat side, as shown in FIG. 2, is effective in terms of the light gathering power. However, the angle of the slanted face 18 of the prism increases with the distance from the optical axis, and as the angle of the slanted face increases, reflections at the interface increase and the light gathering power decreases. To address this, in a segment located away from the optical axis, the prism has been designed so that the light is first totally reflected at the slanted face 18 and then refracted at the perpendicular face 17, as shown in FIG. 3. This achieves a high light gathering power. This is particularly effective in regions where the F-number (focal length/lens diameter) expressed as the ratio of the focal length to the diameter of the lens is small, and a light gathering power larger than a refraction type Fresnel lens can be achieved.

Figure 4:
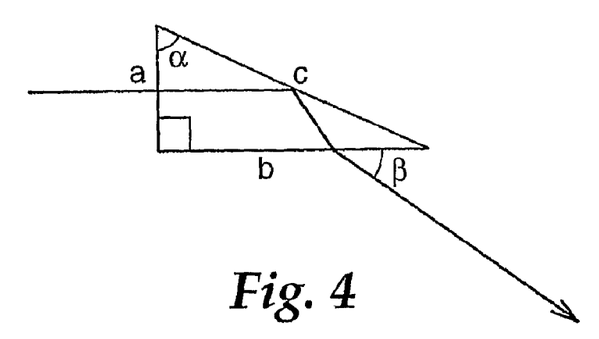
FIG. 4 is a diagram for explaining a light path in a single-step total reflection prism.

In a commonly used total reflection prism, the light incident perpendicular to a flat face "a" is totally reflected once at a slanted face "c", and then refracted at a perpendicular face "b" and directed to the focal point, as shown in FIG. 4.

Figure 5:
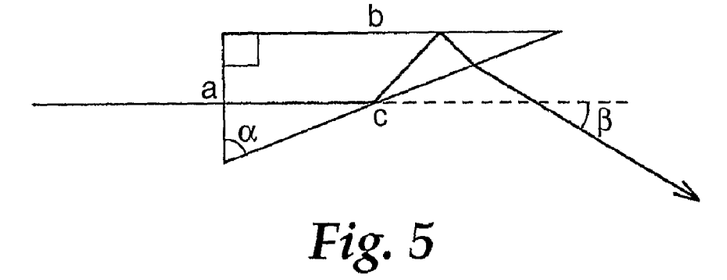
FIG. 5 is a diagram for explaining a light path in a two-step total reflection prism.

On the other hand, in the case of a prism such as shown in FIG. 5, the light incident perpendicular to the flat face "a" is totally reflected once at the slanted face "c", and again at the perpendicular face "b", and then refracted at the slanted face "c" and directed to the focal point. In such a prism, the angle of incidence at the refraction required to achieve the same deviation angle β is smaller, and the loss due to Fresnel reflection is reduced. As a result, compared with the conventional reflection/refraction Fresnel lens comprising the prisms in which the light undergoes total internal reflection once, the reflection/refraction Fresnel lens comprising the prisms in which the light undergoes total internal reflection twice is expected to achieve a higher light gathering efficiency.

Figure 6:
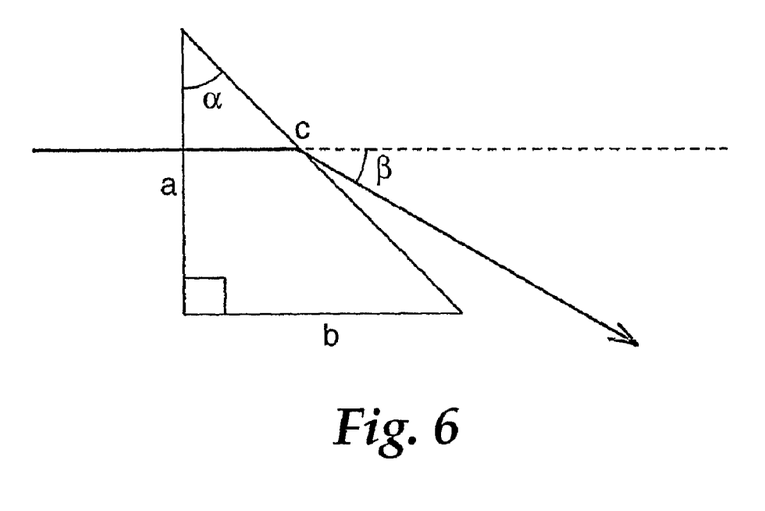
FIG. 6 is a diagram for explaining a light path in a refraction prism.

For the refraction type shown in FIG. 6, the deviation angle β is given by:

$$\beta = \sin^{-1}(n \sin \alpha) - \alpha$$

where α is the prism vertex angle and n is the refractive index of the prism material.

For the single-step total reflection type shown in FIG. 4, the deviation angle β (deg) is given by:

$$\beta = 90 - \sin^{-1}(n \sin(2\alpha - 90))$$

and for the two-step total reflection type shown in FIG. 5, the deviation angle β is given by:

$$\beta = \alpha - \sin^{-1}(3\alpha - 180)$$

Generally, when total internal reflection occurs m times where m is an even integer, the deviation angle β is given by:

$$\beta = \alpha - \sin^{-1}(n \sin((m+1)\alpha - 90m))$$

and when m is an odd integer, then:

$$\beta = 90 - \sin^{-1}(n \sin((m+1)\alpha - 90m))$$

Figure 7:
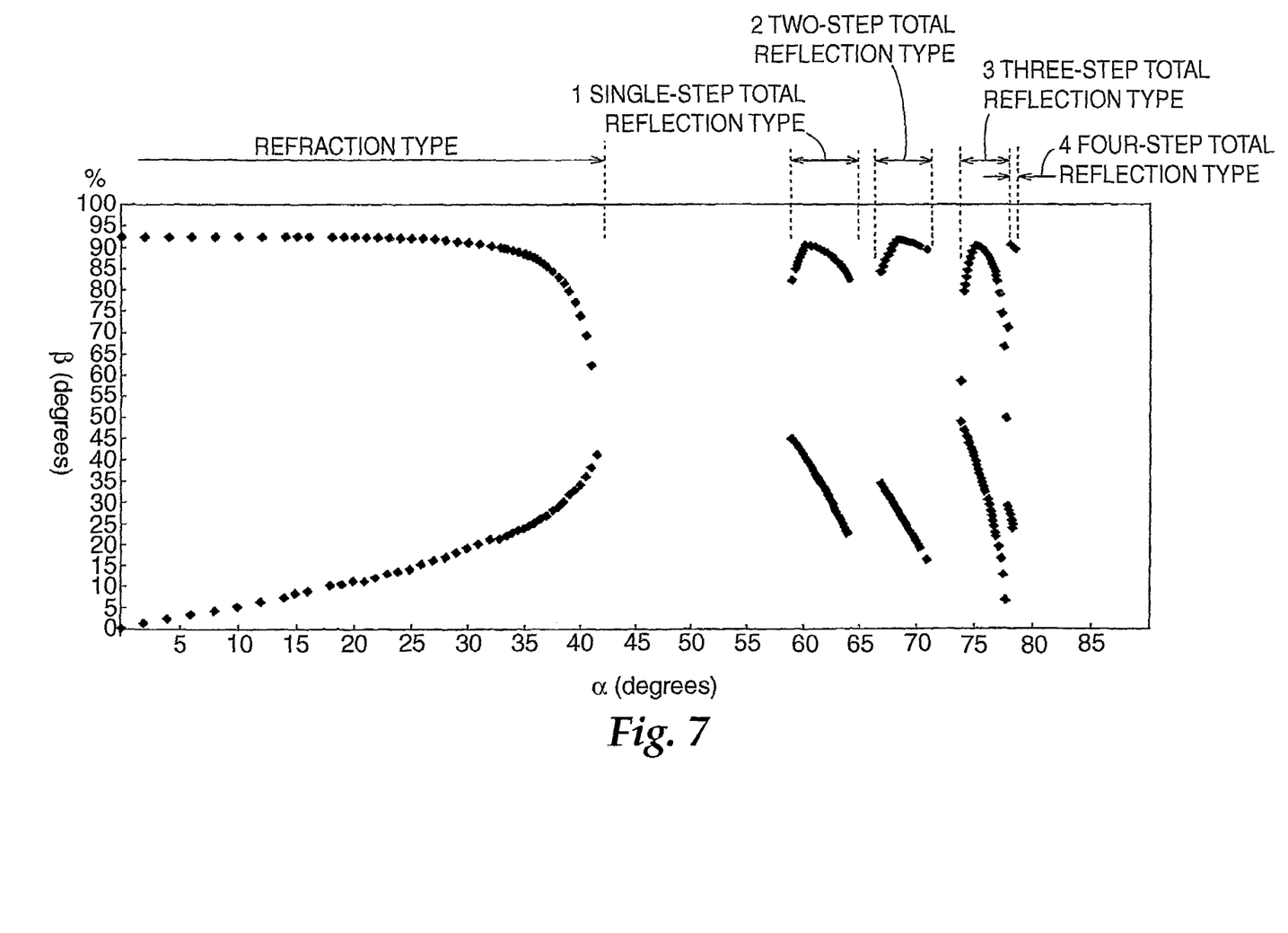
FIG. 7 is a graph plotting deviation angle $\beta$ and transmittance as a function of vertex angle $\alpha$.

Tables 1 to 5 show the results of calculations of the deviation angle β and transmittance I for various vertex angles for a refraction prism, a single-step total reflection prism, a two-step total reflection prism, a three-step total reflection prism, and a four-step total reflection prism, respectively, when an acrylic resin with a refractive index of 1.494 for a wavelength of 546 nm is used as the prism material. In the tables, regions marked with "*" indicate the regions where the transmittance drops due to interference with an adjacent prism. These results are plotted in the form of a graph in FIG. 7.

TABLE 1

TABLE 1. REFRACTION TYPE

| α° | β° | I |
|---|---|---|
| 0.0 | 0.0 | 0.923 |
| 2.0 | 1.0 | 0.923 |
| 4.0 | 2.0 | 0.923 |
| 6.0 | 3.0 | 0.923 |
| 8.0 | 4.0 | 0.923 |
| 10.0 | 5.0 | 0.923 |
| 12.0 | 6.0 | 0.923 |
| 14.0 | 7.1 | 0.923 |
| 15.0 | 8.0 | 0.923 |
| 16.0 | 8.6 | 0.923 |
| 18.0 | 10.0 | 0.922 |
| 19.0 | 10.2 | 0.922 |
| 20.0 | 10.9 | 0.922 |
| 21.0 | 11.0 | 0.921 |
| 22.0 | 12.0 | 0.921 |
| 23.0 | 13.0 | 0.920 |
| 24.0 | 13.3 | 0.919 |
| 25.0 | 14.0 | 0.918 |
| 26.0 | 15.1 | 0.917 |
| 27.0 | 15.9 | 0.916 |
| 28.0 | 16.9 | 0.914 |
| 29.0 | 18.0 | 0.912 |
| 30.0 | 18.8 | 0.909 |
| 31.0 | 19.9 | 0.906 |
| 32.0 | 20.9 | 0.901 |
| 32.1 | 20.9 | 0.901 |
| 32.7 | 21.1 | 0.898 |
| 33.0 | 21.8 | 0.896 |
| 33.1 | 22.0 | 0.895 |
| 33.2 | 22.0 | 0.895 |
| 33.3 | 22.1 | 0.894 |
| 33.4 | 22.0 | 0.893 |
| 33.5 | 22.0 | 0.893 |
| 34.0 | 23.0 | 0.889 |
| 34.5 | 23.5 | 0.885 |
| 35.0 | 23.8 | 0.880 |
| 35.2 | 24.5 | 0.878 |
| 35.4 | 24.5 | 0.876 |
| 35.6 | 25.0 | 0.873 |
| 35.8 | 25.0 | 0.871 |
| 36.0 | 25.2 | 0.868 |
| 36.2 | 25.6 | 0.865 |
| 36.4 | 26.0 | 0.862 |
| 36.6 | 26.3 | 0.859 |
| 36.8 | 26.8 | 0.856 |
| 37.0 | 26.8 | 0.852 |
| 37.5 | 28.0 | 0.841 |
| 38.0 | 29.0 | 0.829 |
| 38.5 | 30.0 | 0.813 |
| 39.0 | 32.0 | 0.793 |
| 39.5 | 32.8 | 0.769 |
| 40.0 | 34.1 | 0.736 |
| 40.5 | 35.8 | 0.691 |
| 41.0 | 38.0 | 0.622 |

TABLE 2

TABLE 2. SINGLE-STEP TOTAL REFLECTION TYPE

| α° | β° | I | |
|---|---|---|---|
| 59.0 | 45.0 | 0.823 | |
| 59.3 | 44.5 | 0.850 | |
| 59.4 | 43.2 | 0.857 | |
| 59.5 | 42.8 | 0.866 | * |
| 59.7 | 43.0 | 0.879 | |
| 59.8 | 42.8 | 0.885 | |
| 59.9 | 42.0 | 0.893 | |
| 60.0 | 41.3 | 0.909 | |
| 60.1 | 41.3 | 0.908 | |
| 60.2 | 41.0 | 0.907 | |
| 60.3 | 40.0 | 0.907 | |

TABLE 2-continued

TABLE 2. SINGLE-STEP TOTAL REFLECTION TYPE

| α° | β° | I |
|---|---|---|
| 60.4 | 40.0 | 0.906 |
| 60.5 | 40.0 | 0.905 |
| 60.6 | 39.0 | 0.904 |
| 60.7 | 38.9 | 0.904 |
| 60.8 | 38.3 | 0.903 |
| 60.9 | 38.0 | 0.902 |
| 61.0 | 37.5 | 0.901 |
| 61.1 | 37.0 | 0.900 |
| 61.2 | 36.8 | 0.899 |
| 61.3 | 36.4 | 0.898 |
| 61.4 | 36.0 | 0.897 |
| 61.5 | 35.9 | 0.895 |
| 61.6 | 35.0 | 0.894 |
| 61.7 | 34.7 | 0.893 |
| 61.8 | 34.1 | 0.891 |
| 61.9 | 33.8 | 0.890 |
| 62.0 | 33.3 | 0.888 |
| 62.1 | 32.6 | 0.886 |
| 62.2 | 32.3 | 0.885 |
| 62.3 | 31.9 | 0.883 |
| 62.4 | 31.4 | 0.881 |
| 62.5 | 31.0 | 0.879 |
| 62.6 | 30.4 | 0.877 |
| 62.7 | 30.0 | 0.875 |
| 62.8 | 29.1 | 0.872 |
| 62.9 | 28.8 | 0.870 |
| 63.0 | 28.1 | 0.867 |
| 63.1 | 28.0 | 0.864 |
| 63.2 | 27.0 | 0.861 |
| 63.3 | 26.8 | 0.857 |
| 63.4 | 26.5 | 0.854 |
| 63.5 | 25.5 | 0.850 |
| 63.6 | 25.0 | 0.846 |
| 63.7 | 24.8 | 0.841 |
| 63.8 | 24.0 | 0.836 |
| 63.9 | 23.2 | 0.831 |
| 64.0 | 22.9 | 0.826 |

TABLE 3

TABLE 3. TWO-STEP TOTAL REFLECTION TYPE

| α° | β° | I |
|---|---|---|
| 66.9 | 34.6 | 0.844 |
| 67 | 34.5 | 0.854 |
| 67.1 | 33.9 | 0.861 |
| 67.2 | 33.6 | 0.867 |
| 67.3 | 33.1 | 0.874 |
| 67.4 | 32 | 0.880 |
| 67.5 | 32 | 0.884 |
| 67.6 | 31.6 | 0.889 |
| 67.7 | 31.5 | 0.892 |
| 67.8 | 31.1 | 0.901 |
| 67.9 | 30.2 | 0.908 |
| 68 | 30 | 0.914 |
| 68.1 | 29.7 | 0.919 |
| 68.2 | 29.1 | 0.918 |
| 68.3 | 29.1 | 0.918 |
| 68.4 | 28.6 | 0.918 |
| 68.5 | 28 | 0.917 |
| 68.6 | 28 | 0.917 |
| 68.7 | 27 | 0.917 |
| 68.8 | 26.8 | 0.916 |
| 68.9 | 26 | 0.916 |
| 69 | 25.6 | 0.915 |
| 69.1 | 25.2 | 0.915 |
| 69.2 | 24.9 | 0.914 |
| 69.3 | 24.8 | 0.914 |
| 69.4 | 23.6 | 0.913 |
| 69.5 | 23.2 | 0.912 |
| 69.6 | 23 | 0.912 |

TABLE 3-continued

TABLE 3. TWO-STEP TOTAL REFLECTION TYPE

| α° | β° | I |
|---|---|---|
| 69.7 | 22.4 | 0.911 |
| 69.8 | 22 | 0.910 |
| 69.9 | 21.9 | 0.909 |
| 70 | 21.1 | 0.908 |
| 70.1 | 20.6 | 0.907 |
| 70.2 | 20 | 0.906 |
| 70.3 | 19.2 | 0.905 |
| 70.9 | 16.6 | 0.895 |

TABLE 4

TABLE 4. THREE-STEP TOTAL REFLECTION TYPE

| α° | β° | I |
|---|---|---|
| 73.9 | 49 | 0.586 |
| 74.2 | 47.1 | 0.797 |
| 74.3 | 46 | 0.811 |
| 74.4 | 45.5 | 0.830 |
| 74.5 | 45 | 0.848 |
| 74.6 | 44.1 | 0.863 |
| 74.7 | 43 | 0.877 |
| 74.8 | 42.6 | 0.891 |
| 74.9 | 42 | 0.904 |
| 75 | 41 | 0.908 |
| 75.1 | 40 | 0.907 |
| 75.2 | 39.7 | 0.905 |
| 75.3 | 38.7 | 0.904 |
| 75.4 | 37.9 | 0.902 |
| 75.5 | 36.8 | 0.900 |
| 75.6 | 36 | 0.898 |
| 75.7 | 35.2 | 0.895 |
| 75.8 | 34.2 | 0.893 |
| 75.9 | 33.8 | 0.890 |
| 76 | 32.8 | 0.887 |
| 76.2 | 31 | 0.879 |
| 76.3 | 30 | 0.875 |
| 76.4 | 28.6 | 0.870 |
| 76.5 | 27.8 | 0.864 |
| 76.6 | 27 | 0.857 |
| 76.7 | 26 | 0.849 |
| 76.8 | 24.5 | 0.841 |
| 76.9 | 23 | 0.831 |
| 77 | 22 | 0.820 |
| 77.2 | 19.5 | 0.789 |
| 77.4 | 16.8 | 0.744 |
| 77.6 | 13 | 0.667 |
| 77.8 | 7 | 0.498 |
| 73.9 | 49 | 0.586 |
| 74.2 | 47.1 | 0.797 |

TABLE 5

TABLE 5. FOUR-STEP TOTAL REFLECTION TYPE

| α° | β° | I |
|---|---|---|
| 77.9 | 29.5 | 0.711 |
| 78 | 28.8 | 0.908 |
| 78.1 | 28 | 0.906 |
| 78.2 | 27 | 0.904 |
| 78.3 | 26 | 0.902 |
| 78.4 | 25 | 0.899 |
| 78.5 | 24 | 0.897 |

From a comparison between Table 1 and Table 2, it can be seen that, in regions of larger deviation angles β, the single-step total reflection prism achieves higher transmittance than the refraction prism does. For example, in the case of the refraction prism, when the vertex angle α is 38.5°, the deviation angle β is 30.0° and, in this case, the transmittance I is 0.813; on the other hand, in the case of the single-step total reflection prism in which the vertex angle α that provides the same deviation angle is 62.7°, a higher transmittance I of 0.875 is achieved.

Referring further to Table 3, it should be noted that, in the case of the two-step total reflection prism also, the deviation angle of 30° is obtained when the vertex angle α is 68°, achieving an even higher transmittance I of 0.914.

Figure 8:
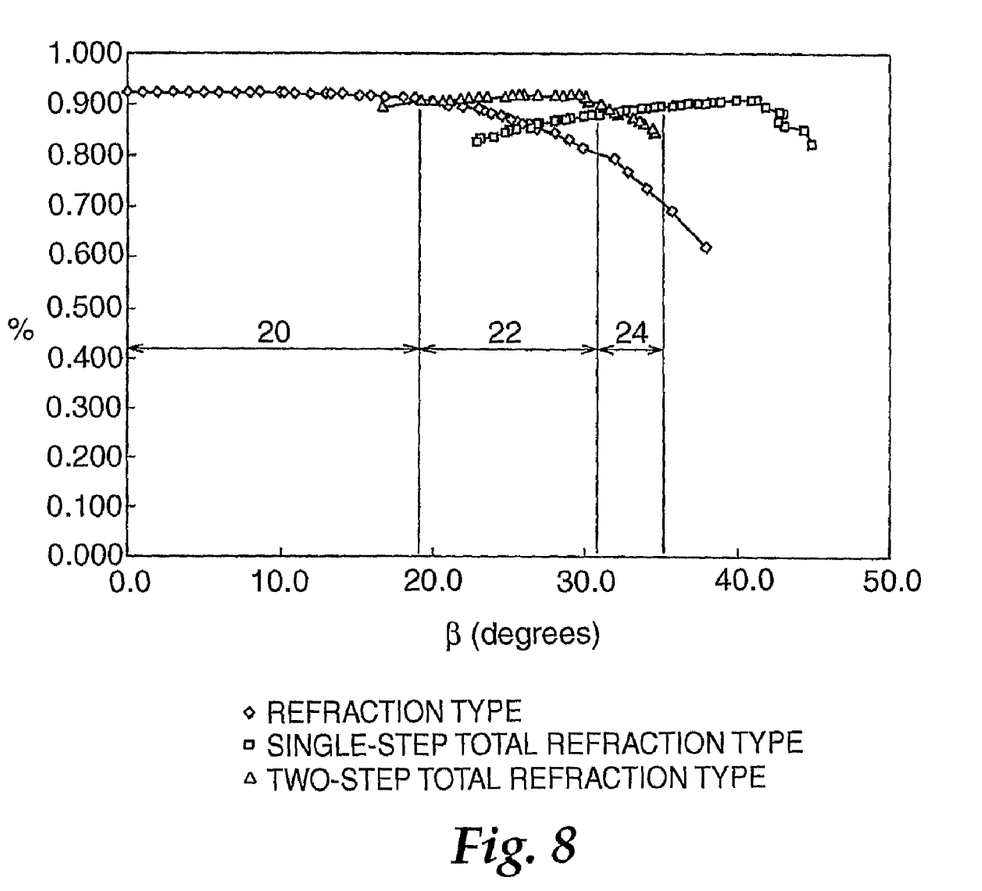
FIG. 8 is a graph plotting transmittance I as a function of deviation angle $\beta$ for various types of prisms.

FIG. 8 shows a graph of the transmittance I as a function of the deviation angle β for the various types of prisms, with the deviation angle β plotted along the abscissa and the transmittance I along the ordinate. From FIG. 8, it can be seen that, in the case of an acrylic resin with a refractive index of 1.494, the prism that achieves the highest transmittance I in a segment 20 where β<19.5° is the refraction prism, the prism that achieves the highest transmittance I in a region 22 where 19.5°<β<31.0° is the two-step total reflection prism, and the prism that achieves the highest transmittance I in a region 24 where 31.0°<β is the single-step total reflection prism.

Table 6 shows the light gathering power for various lenses of different f-numbers when only the refraction prism is used (indicated as PRIOR ART 1), when the single-step total reflection prism is used in the segment of 20°≦β (indicated as PRIOR ART 2), and when, in accordance with the present invention, the two-step total reflection prism is used in the segment of 20°≦β≦29° and the single-step total reflection prism in the segment of 29°≦β (indicated as PRESENT INVENTION), respectively. The results are shown in the form of a graph in FIG. 9.

TABLE 6

TABLE 6. COMPARISON OF LIGHT GATHERING POWER

| F-NUMBER | PRIOR ART 1 | PRESENT INVENTION | PRIOR ART 2 |
|---|---|---|---|
| 2.00 | 0.922 | | |
| 1.75 | 0.921 | | |
| 1.50 | 0.918 | | |
| 1.35 | 0.916 | | |
| 1.20 | 0.912 | | |
| 1.10 | 0.909 | | |
| 1.00 | 0.904 | 0.914 | |
| 0.95 | 0.899 | 0.915 | |
| 0.90 | 0.893 | 0.915 | 0.897 |
| 0.85 | 0.886 | 0.915 | 0.895 |
| 0.80 | 0.875 | 0.913 | 0.893 |
| 0.75 | 0.862 | 0.897 | 0.893 |
| 0.70 | 0.846 | 0.899 | 0.893 |
| 0.65 | 0.822 | 0.902 | 0.893 |
| 0.60 | 0.789 | 0.903 | 0.896 |
| 0.55 | 0.742 | 0.901 | 0.895 |
| 0.50 | 0.677 | 0.889 | 0.886 |
| 2.00 | 0.922 | | |

Figure 9:
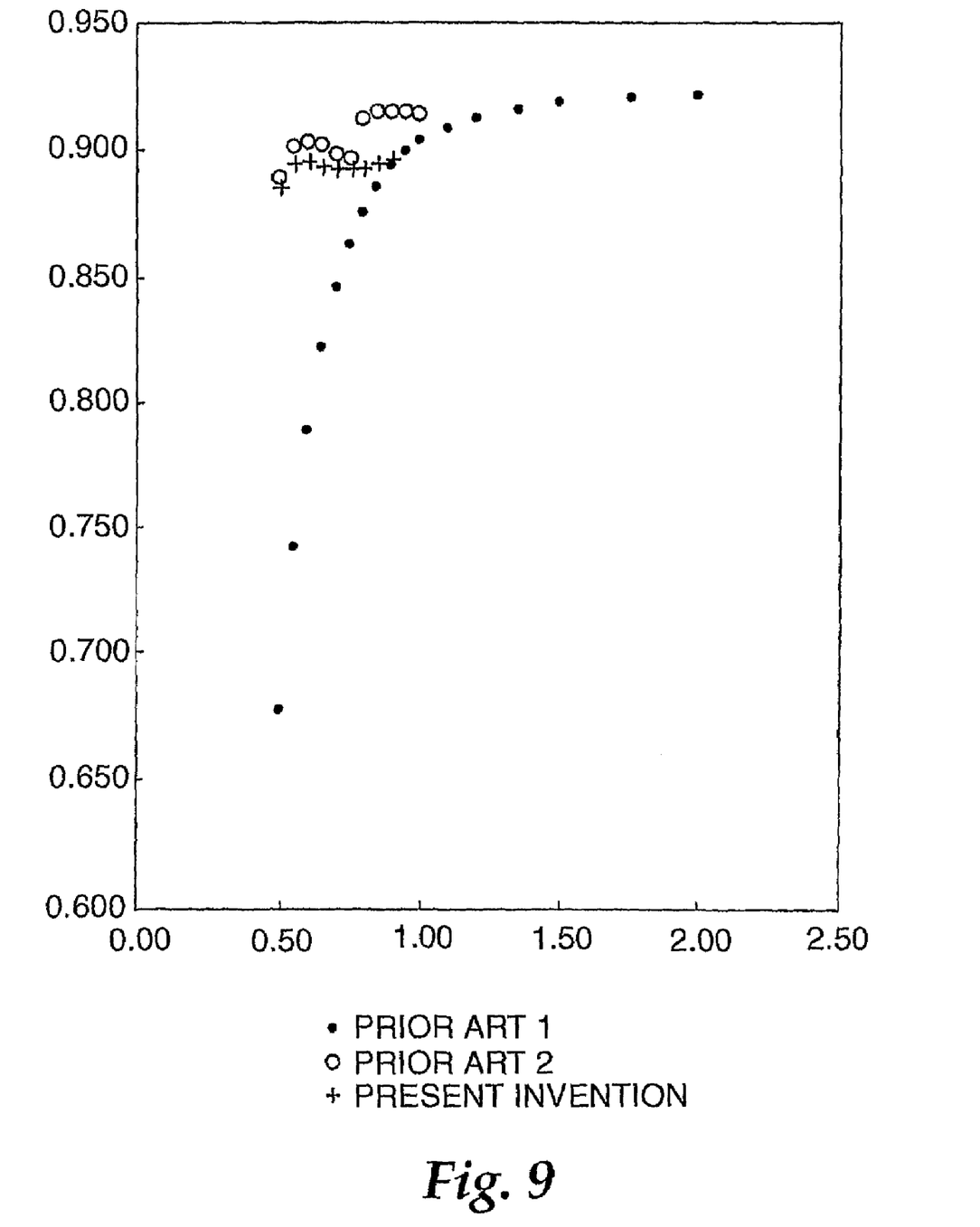
FIG. 9 is a graph showing the light gathering power of a Fresnel lens according to the present invention for comparison with Fresnel lenses according to the prior art.

From Table 6 and FIG. 9, it can be seen that, in the case of a lens whose f-number is 1.00 or smaller, the Fresnel lens of the present invention which uses the two-step total reflection prism in a portion thereof achieve a high light gathering power.

Figure 10:
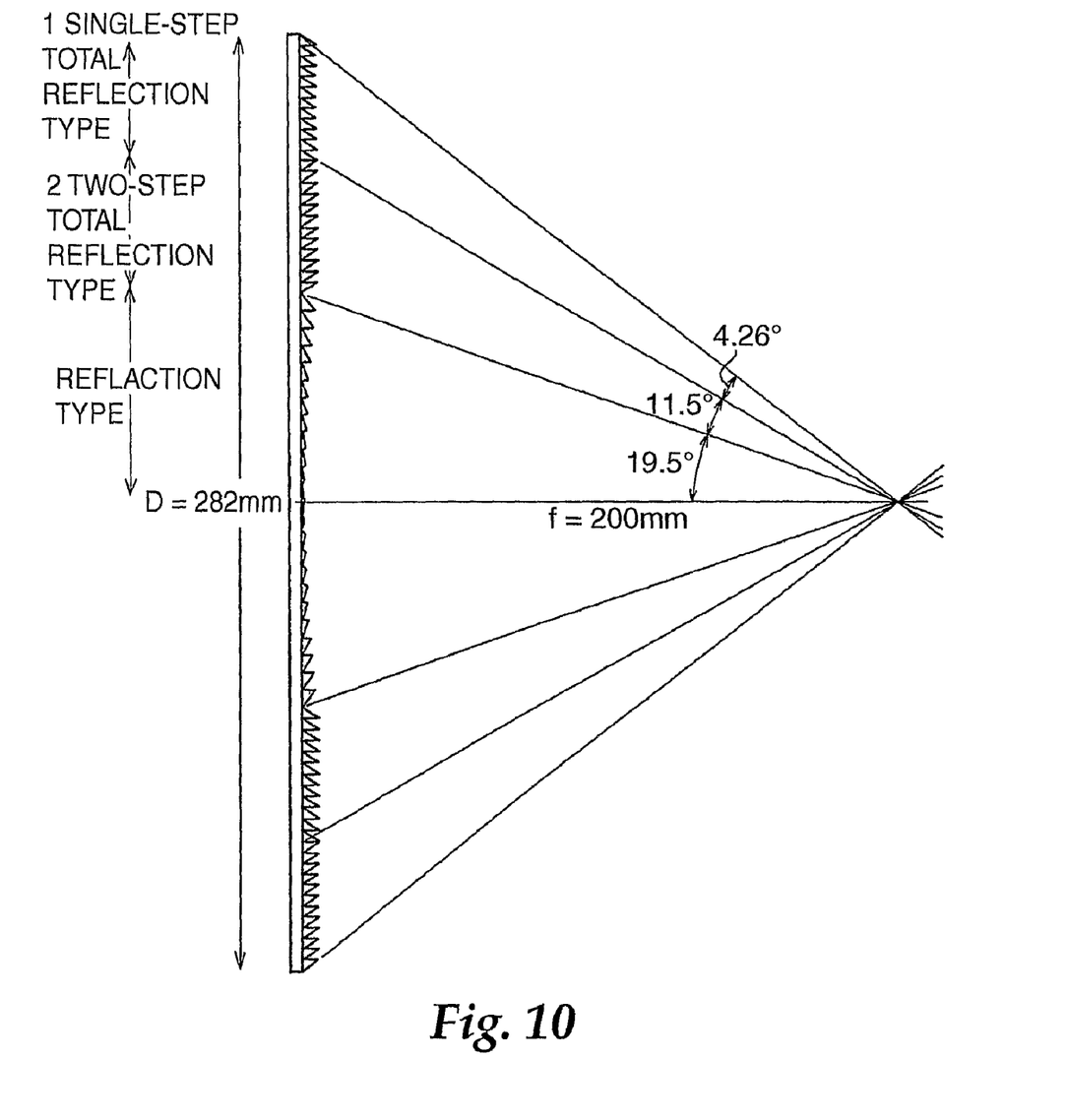
FIG. 10 is a diagram showing one example of the Fresnel lens of the present invention when an acrylic resin, whose refractive index for a wavelength of 546 nm is centered around 1.494, is not smaller than 1.484 but is not larger than 1.504, is used.

Next, a description will be given of the case where a square-shaped circular Fresnel lens (a concentric Fresnel lens cut in a square shape) measuring 200 mm square and having a focal length of 200 mm is constructed using an acrylic resin whose refractive index for a wavelength of 546 nm is centered around 1.494, is not smaller than 1.484, but is not larger than 1.504. The diagonal of the 200-mm square lens is 282 mm, and the F-number relative to the diagonal of the square is 0.709 which is smaller than 1. As a result, if the lens were constructed using only refraction prisms, the light gathering efficiency of the lens as a whole would substantially drop. Therefore, total reflection prisms are used in portions located away from the optical axis. That is, in portions outside the boundary across which the relationship between the transmittance of the refraction prism and that of the reflection prism is reversed, total reflection prisms in each of which total internal reflection occurs twice and total reflection prisms in each of which total internal reflection occurs once are arranged as shown in FIG. 10. More specifically, in FIG. 10, the refraction prisms are used in the segment where the deviation angle is in the range of 0 degree to 19.5 degrees, while the two-step total reflection prisms are arranged in the segment of 19.5 degrees to 31 degrees, and the single-step total reflection prisms in the segment of 31 degrees to 35.26 degrees. The Fresnel lens thus constructed achieves a higher light gathering efficiency than any Fresnel lenses constructed using only the refraction prisms and single-step total reflection prisms.

Figure 11:
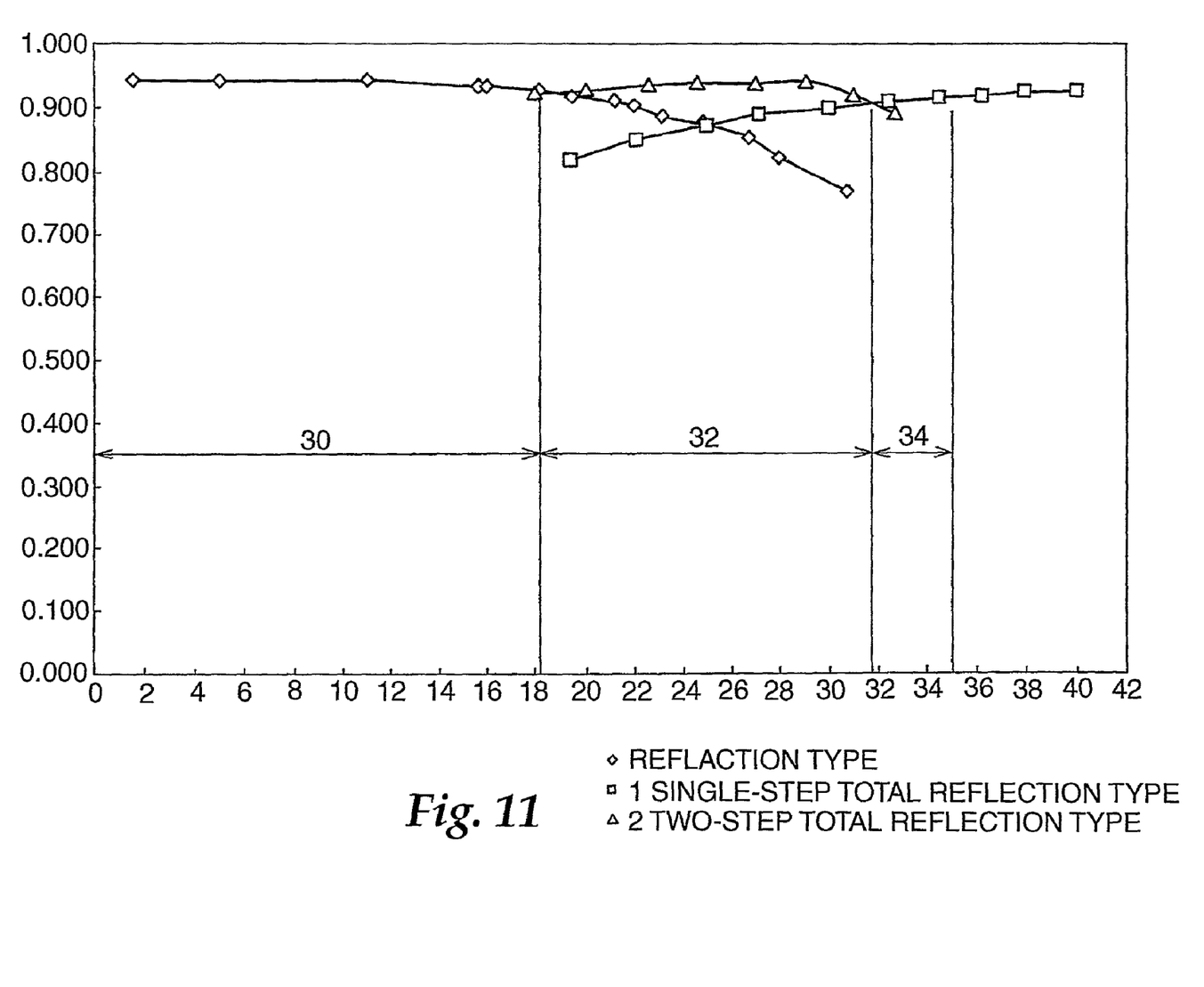
FIG. 11 is a graph plotting transmittance I as a function of deviation angle $\beta$ for various types of prisms when silicone rubber with a refractive index of 1.40 is used.

Tables 7 to 9 show the results of calculations of the deviation angle β and transmittance I for a refraction prism, a single-step total reflection prism, and a two-step total reflection prism, respectively, when silicone rubber with a refractive index of 1.400 for a wavelength of 546 nm is used as the prism material. FIG. 11 shows a graph of the transmittance I as a function of the deviation angle β for the various types of prisms.

TABLE 7

TABLE 7. REFRACTION TYPE (SILICONE RUBBER)

| α° | β° | I |
|---|---|---|
| 3.0 | 1.5 | 0.944 |
| 13.0 | 5.0 | 0.943 |
| 23.0 | 11.0 | 0.942 |
| 30.8 | 15.6 | 0.934 |
| 32.0 | 16.0 | 0.932 |
| 34.0 | 18.1 | 0.925 |
| 36.0 | 19.5 | 0.916 |
| 37.0 | 21.2 | 0.909 |
| 38.0 | 22.0 | 0.900 |
| 39.0 | 23.1 | 0.884 |
| 40.0 | 24.8 | 0.873 |
| 41.0 | 26.7 | 0.851 |
| 42.0 | 28.0 | 0.819 |
| 43.0 | 30.7 | 0.769 |

TABLE 8

TABLE 8. SINGLE-STEP TOTAL REFLECTION TYPE (SILICONE RUBBER)

| α° | β° | I |
|---|---|---|
| 61.5 | 40.0 | 0.928 |
| 62.0 | 38.0 | 0.925 |
| 62.5 | 36.3 | 0.921 |
| 63.0 | 34.5 | 0.915 |
| 63.5 | 32.4 | 0.908 |
| 64.0 | 30.0 | 0.899 |
| 64.5 | 27.2 | 0.887 |
| 65.0 | 25.0 | 0.871 |
| 65.5 | 22.1 | 0.849 |
| 66.0 | 19.4 | 0.815 |

TABLE 9

TABLE 9. TWO-STEP TOTAL REFLECTION TYPE (SILICONE RUBBER)

| α° | β° | I |
|---|---|---|
| 68.0 | 32.7 | 0.892 |
| 68.5 | 31.0 | 0.918 |
| 69.0 | 29.0 | 0.939 |
| 69.5 | 27.0 | 0.937 |
| 70.0 | 24.6 | 0.935 |
| 70.5 | 22.6 | 0.932 |
| 71.0 | 20.0 | 0.927 |
| 71.5 | 18.0 | 0.922 |

Figure 12:
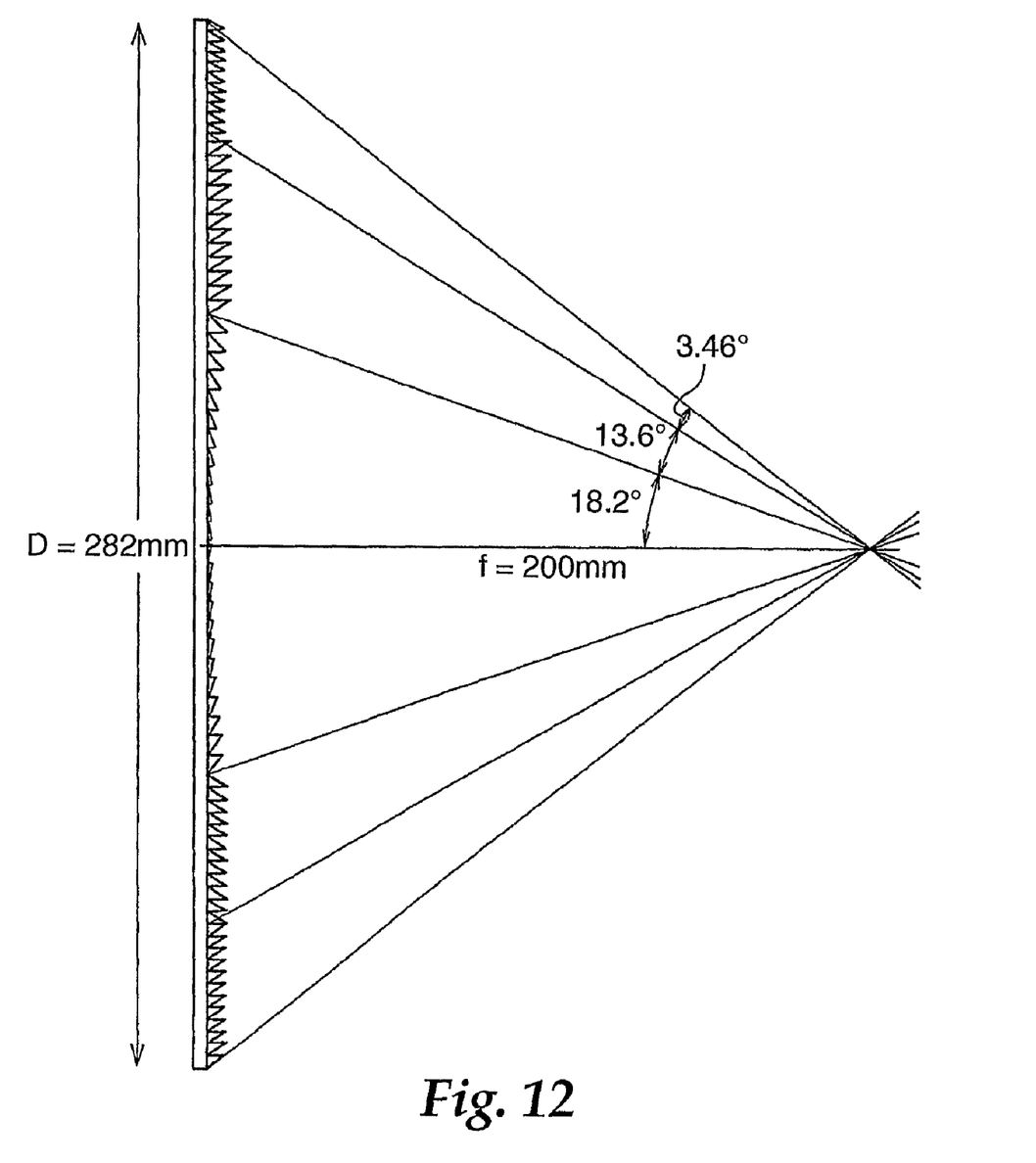
FIG. 12 is a diagram showing one example of the Fresnel lens of the present invention when silicon rubber, whose refractive index for a wavelength of 546 nm is centered around 1.400, is not smaller than 1.390 but is not larger than 1.410, is used.

As can be seen from FIG. 11, in the case of silicone rubber whose refractive index for a wavelength of 564 nm is centered around 1.400, is not smaller than 1.390 but is not larger than 1.410, when refraction prisms are used in a segment 30 where β<18.2°, two-step total reflection prisms in a segment 32 where 18.2°<β<31.8°, and single-step total reflection prisms in a segment 34 where 31.8°<β, as shown in FIG. 12, a Fresnel lens having a high light gathering power can be achieved.

The invention claimed is:

1. A Fresnel lens constructed from a plurality of prisms, wherein at least some of said plurality of prisms each have a vertex angle that causes incident light from a focal point or incident light entering from an opposite side thereof in parallel to an optical axis to be totally internally reflected at least twice, comprising a first segment formed from prisms each having a vertex angle that does not cause said incident light to be totally reflected, and a second segment adjacent thereto and formed from prisms each having a vertex angle that causes said incident light to be totally internally reflected twice.

2. A Fresnel lens according to claim 1, further comprising a third segment adjacent to said second segment and formed from prisms each having a vertex angle that causes said incident light to be totally internally reflected once.

3. A Fresnel lens according to claim 2, wherein said Fresnel lens is formed from a material of acrylate resin whose refractive index for a wavelength of 546 nm is centered around 1.494, is not smaller than 1.484 but is not larger than 1.504, and wherein each prism in said first segment has a deviation angle not larger than 20 degrees, each prism in said second segment has a deviation angle not smaller than 19 degrees but not larger than 32 degrees, and each prism in said third segment has a deviation angle not smaller than 30 degrees.

4. A Fresnel lens according to claim 2, wherein said Fresnel lens is formed from a material of silicone rubber whose refractive index for a wavelength of 546 nm is centered around 1.400, is not smaller than 1.390 but is not larger than 1.410, and wherein each prism in said first segment has a deviation angle not larger than 19 degrees, each prism in said second segment has a deviation angle not smaller than 18 degrees but not larger than 32 degrees, and each prism in said third segment has a deviation angle not smaller than 31 degrees.

* * * * *